Figures 1, 2:
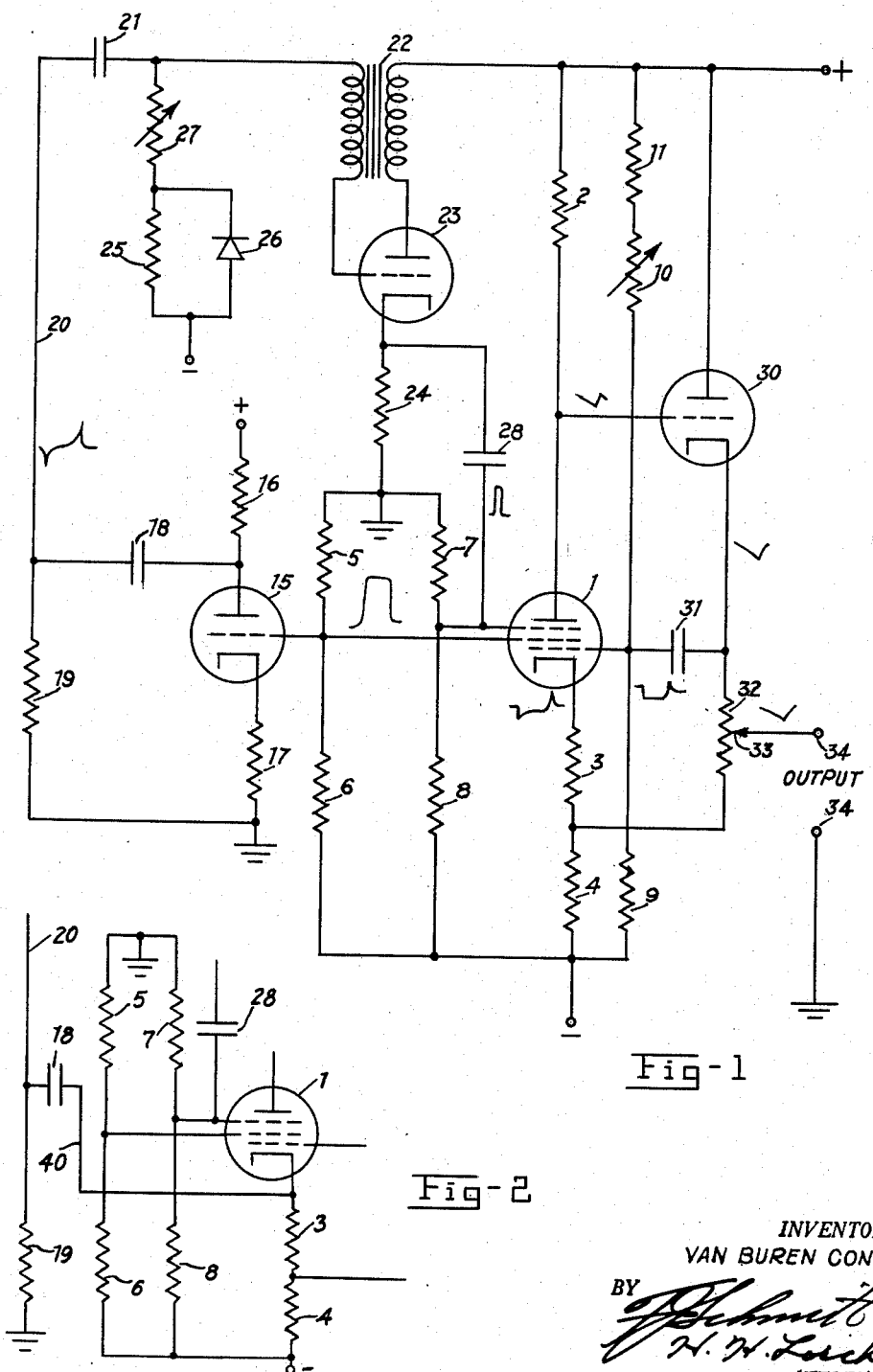

May 20, 1958 VAN BUREN CONES 2,835,815
SELF-TRIGGERED SAWTOOTH WAVE GENERATOR
Filed July 23, 1956

INVENTOR.
VAN BUREN CONES
BY
ATTORNEYS

United States Patent Office 2,835,815
Patented May 20, 1958

2,835,815

SELF-TRIGGERED SAWTOOTH WAVE GENERATOR

Van Buren Cones, Indianapolis, Ind.

Application July 23, 1956, Serial No. 599,667

8 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

This invention relates to sawtooth wave generator means and more particularly to a novel self-triggered sawtooth wave generator with a very high degree of linearity and stability in repetition utilizing a pentode sawtooth wave generator circuit or phantastron to trigger itself without any external triggering source.

In well-known phantastron sweep generators now in use it is necessary to obtain a triggering source from an external circuit to trigger the phantastron and thus generate sawtooth waves on a grid or anode output thereof in accordance with the triggering source. It is also well-known in the art to use blocking oscillators as external triggering sources. Such circuitry is bulky and requires considerable electronic equipment to obtain the desired generated sawtooth wave forms.

In the present invention a pentode or phantastron sweep generator circuit is utilized in circuit with a blocking oscillator as the initial trigger for the pentode or phantastron grid with each pentode or phantastron generated wave triggering each succeeding wave through the blocking oscillator. Rectangular voltage waves from one of the pentode or phantastron elements are conducted by coupling this element through a differentiating network to produce a positive pulse out of the differentiating network at the trailing edge of each rectangular wave to effect such triggering of the pentode or phantastron through the blocking oscillator. A capacitor in series with a cathode follower coupling the anode and one grid of the pentode or phantastron with a grid resistor to positive potential determines the time duration and frequency of the sawtooth waves. This time duration or repetition frequency may easily be made adjustable by a variable resistor in series with a grid capacitor charging circuit for varying the charging rate on the capacitor. Various ranges of time duration for the sawtooth waves may be selected easily by switching to different values of capacitors in the grid circuit of the pentode or phantastron. It is, therefore, a general object of this invention to provide a sawtooth wave generator circuit which is self-triggering over a wide, adjustable range maintaining very stable operation with excellent linearity in the sawtooth voltage wave forms.

These and other objects, advantages, features, and uses may become more apparent as the description proceeds when considered together with the accompanying figures illustrating the invention in schematic form, in which;

Figure 1 illustrates a schematic wiring diagram of the preferred form of the invention, and Figure 2 illustrates a partial schematic wiring diagram including a modification of Figure 1.

Referring to the figures, a pentode 1 has its anode coupled through a fixed anode resistor 2 to a positive voltage source and its cathode coupled through fixed resistors 3 and 4 in series to a negative voltage source. The screen grid of pentode 1 is coupled to voltage divider resistances 5 and 6 connected between a negative direct current voltage source and ground. The suppressor grid of pentode 1 is connected to voltage divider resistances 7 and 8 coupled between the negative direct current voltage source and ground. The control grid of pentode 1 is coupled to divider resistances 9, 10 and 11 between the positive and negative voltage sources, the resistance 10 being variable.

The screen grid of pentode 1 is coupled directly to the control grid of an amplifier tube 15 which tube has its anode coupled through a fixed resistance 16 to an anode voltage source and its cathode coupled through a fixed resistance 17 to ground. The anode of the amplifier tube 15 is coupled to a differentiating network consisting of a capacitor 18 and a fixed resistor 19 in series to ground. The output of the differentiating network is taken from the juncture of capacitor 18 and resistor 19 over a lead 20 through a coupling capacitor 21 and a secondary of a transformer 22 to the grid of a blocking oscillator tube 23. The amplifier tube 15 inverts the wave passing therethrough which inverted rectangular wave from the anode could be applied to the cathode of a cathode ray tube using control grid blanking for additional blanking, when desired.

Blocking oscillator tube 23 has its anode coupled to an anode voltage supply through the primary of the transformer 22 and its cathode coupled through a fixed resistor 24 to ground. A negative grid bias is placed on the grid of the blocking oscillator tube 23 from a negative direct current voltage source through a resistance 25 and rectifier 26 in parallel, thence in series through a variable resistance 27 to the juncture of the coupling capacitor 21 and the secondary of the transformer 22. The rectifier 26 is utilized to safeguard against overconduction of the oscillator grid circuit during the unblocked condition of the blocking oscillator. A fixed resistor may be used in place of the variable resistor 27 where it is desirable to definitely fix the bias on the blocking oscillator tube 23 to produce a predetermined cutoff for preselected conditions of the generator circuit. The cathode of the blocking oscillator tube 23 is connected through a coupling capacitor 28 to the suppressor grid of the pentode 1. The elements 22 to 27, inclusive, constitute a blocking oscillator circuit.

The anode of the pentode 1 is coupled through a cathode follower tube 30 and capacitor 31 to the control grid of this pentode. The anode of the cathode follower tube 30 is coupled directly to the anode voltage source, and the cathode thereof is branch connected through a potentiometer to the juncture of cathode resistors 3 and 4. The movable tap 33 of the potentiometer 32 is coupled to one output terminal 34 for the sawtooth wave generator circuit, the other output terminal 34 being grounded.

The cathode voltage resistors 3 and 4 relative to the divider resistances 7 and 8 are such that the cathode voltage is above that of the suppressor grid voltage in the quiescent state of the sawtooth wave generator circuit.

In the operation of the self-triggered sawtooth wave generator circuit let it first be considered in three different states: first, that of its quiescent state; secondly, that of the positive trigger state, and; thirdly, that of the sawtooth wave generating state. In the quiescent state the anodes and grids of the pentode 1 and the amplifier tube 15 are clamped to fixed values of potentials between positive and negative limits by means of the resistance dividers. The cathode potential of pentode 1 is above the suppressor grid potential which cuts off the anode but permits current flow between the cathode and the screen grid, which current is insufficient to render the amplifier tube 15 conductive.

In the positive trigger state, a positive trigger is applied to the suppressor grid whereby the anode of pentode 1 is caused to conduct resulting in a sudden drop in anode voltage which is applied to the control grid of pentode 1 through the cathode follower tube 30 and the capacitor 31. This causes the cathode current of pentode 1 to fall to a small enough value to bring the cathode potential below that of the suppressor grid which allows anode current to flow, whereupon the anode voltage starts to go negative to produce a negative sawtooth wave on this anode.

In the sawtooth wave generating state the screen grid potential rises rapidly, the control grid potential drops rapidly, and the anode potential falls linearly until the pentode tube 1 "bottoms." When the pentode tube 1 "bottoms" cathode voltage rises rapidly until it is above the suppressor grid potential which again cuts off anode current. When the anode current is cut off its potential rises rapidly exponentially to the quiescent state.

The conduction of current between the cathode and screen grid of pentode 1 produces substantially a positive square wave on the screen grid, which positive square wave is amplified and inverted by the amplifier tube 15. The inverted wave is differentiated by the differentiating circuit 18, 19 producing a negative pip at the leading edge and a positive pip at the trailing edge of this inverted wave. The negative pip has no effect in unblocking the blocking oscillator tube and, therefore, may be disregarded; however, the positive pip is operative to unblock the blocking oscillator tube 23, producing a voltage rise across the cathode resistor 24 which produces a sharp triggering pulse on this cathode operative through the coupling capacitor 28 on the suppressor grid of the pentode 1. This triggering pulse triggers the pentode 1 for the next generated sawtooth wave on the anode of pentode 1. This sawtooth wave is negative going and, being applied to the grid of the cathode follower tube 30, likewise appears on the cathode of this tube as a negative going sawtooth wave which may be taken from the adjustable tap of the potentiometer 32 in a proportion in accordance with the adjustment of the adjustable tap 33. Illustrations of wave forms are given at several points in the figures of drawing to facilitate the understanding of the sequence in developing the generated sawtooth waves. From the foregoing it may be seen that each sawtooth wave generated will cause a trigger for the succeeding sawtooth wave generated since the trailing edge of the sawtooth wave produces a corresponding trailing edge of a substantial square wave on the screen grid or cathode of pentode 1 which is used through the differentiating circuit and blocking oscillating circuit to trigger the next succeeding sawtooth wave on the anode of pentode 1. The variable resistance 27 may be adjusted to change the bias or the point at which the blocking oscillator becomes unblocked to produce the triggering pulse on the suppressor grid of pentode 1. The variable resistance 10, which may be two variable resistors in series, one for coarse and one for fine adjustment, may be varied to control the charge on the charging condenser 31, thereby to vary the time or repetition frequency rate of the generated sawtooth waves. While the repetition rate of the generated sawtooth waves may be made to vary widely by the selection of the storage capacitor 31 and variable resistor 10, it may be reasonably understood that control of the variable resistance 10 may well vary the length of the sawtooth waves from about a dozen microseconds to a number of tenths of a second. The negative sawtooth generated waves may be inverted in an amplifier (not shown), or the like, where it is desirable to use positive wave forms.

Referring now to Figure 2, there is reproduced a part of the schematic wiring diagram shown in Figure 1 with all like parts reproduced from Figure 1 having the same reference characters. At some sacrifice of the stability of the circuit of Figure 1, the amplifier 15 and its anode and cathode biasing resistors may be eliminated. With the elimination of the amplifier tube and its circuitry, the cathode of the pentode 1 may be connected directly to the differentiating circuit by direct connection of the cathode of pentode 1 through a conductor 40 to one plate of the capacitor 18 whereby the waveform on the cathode of pentode 1 may be applied directly to the differentiating circuit. It may be obvious to a mechanic skilled in the art in view of the above teaching that the cathode of pentode 1 may be coupled directly to the grid of the blocking oscillator tube through the conductor 20 or through an amplifier, as is well understood by mechanics skilled in the art since the waveform produced on this cathode provides a positive peak occurring at the end of the sawtooth wave produced on the anode. Even less stability may be satisfactory for some applications which would allow the elimination or change in arrangement of some of the elements where the proper selection of resistance values and voltage dividers may be made, as is well understood in the art.

While many modifications and changes may be made in the circuit diagram herein illustrating this invention, it is to be understood that I desire to be limited only by the scope of the appended claims.

I claim:

1. A self-triggered sawtooth wave generator comprising; a pentode vacuum tube having five electrodes with the cathode and anode electrodes coupled across a voltage supply circuit; a blocking oscillator including a triode vacuum tube having its cathode connected through a coupling capacitor to the suppressor electrode of said pentode; a voltage dividing network coupled one each to each suppressor and screen grid electrodes of said pentode for establishing a predetermined voltage level on each of these grids; a cathode follower triode tube having its grid coupling the anode electrode and its cathode coupling the control grid electrode through a capacitor of said pentode, said cathode also coupled through a capacitor of said pentode, said cathode also coupled through a potentiometer with the movable tap thereof providing an output circuit; and means coupling one of said pentode electrodes to the grid of said blocking oscillator tube for unblocking said blocking oscillator tube in accordance with each conduction period of said pentode to initiate a succeeding conduction period, the voltage waveforms produced by these conduction periods being impressed on said potentiometer movable tap.

2. A self-triggered sawtooth wave generator as set forth in claim 1 wherein said means coupling one of said pentode electrodes to the grid of the blocking oscillator tube consists of a triode amplifier having its grid coupled to the screen electrode of said pentode and its anode output coupled through a differentiating network to said blocking oscillator tube grid.

3. A self-triggered sawtooth wave generator as set forth in claim 1 wherein said means coupling one of said pentode electrodes to the grid of the blocking oscillator tube consists of coupling the cathode of said pentode through a differentiating network to the oscillator tube grid.

4. A self-triggered sawtooth wave generator as set forth in claim 1 wherein the control grid of said blocking oscillator and the negative voltage supply are coupled with a variable resistor in series with a diode and resistor parallel combination whereby the blocking period of said blocking oscillator may be adjusted to compensate for changing tube characteristics of said blocking oscillator or the changing of said blocking oscillator vacuum tubes to trigger succeeding sawtooth waves by anode conduction of said pentode at the end of the period of each preceding sawtooth wave on said anode detectable on the cathode of said cathode follower.

5. A self-triggered sawtooth wave generator as set forth in claim 1 wherein the conduction period producing a voltage wave formed by anode conduction of said pentode is adjusted by a variable resistor coupling a positive supply voltage and the control grid of said pentode whereby the time period of the voltage wave is proportional to the charging rate on the capacitor coupling the cathode of said cathode follower and the control grid of said pentode.

6. A self-triggered sawtooth wave generator comprising: a pentode vacuum tube having its anode and cathode coupled in a voltage supply circuit; a blocking oscillator having its cathode coupled to the suppressor grid of said pentode; an amplifier tube having its control grid connected to the screen grid of said pentode and its anode coupled through a differentiating network to the grid of said blocking oscillator; means for adjusting the bias on the grid of said blocking oscillator; a cathode follower tube having its grid connected to the anode of said pentode and its cathode coupled through a capacitor to the control grid of said pentode; a voltage divider network coupled to said pentode cntrol grid and having a variable resistor therein for varying the charging rate in said capacitor; and a potentiometer coupled between the cathode of said cathode follower and low voltage supply with the adjustable tap thereof providing an output whereby a voltage wave formed on the screen grid of said pentode simultaneously with a sawtooth wave formed on the anode of same is amplified and differentiated, the positive peak of said differentiated wave unblocking said blocking oscillator to trigger said pentode anode conduction producing a sawtooth wave on the anode thereof for a time duration proportional to the charging rate in said capacitor causing a repetition of simultaneous waves on elements of said pentode with the self-triggered sawtooth waves being impressed on the output tap of the potentiometer connected to the cathode of said cathode follower.

7. A self-triggered sawtooth wave generator as set forth in claim 6 wherein said means for biasing the grid of said blocking oscillator to selected cut-off is a resistor-rectifier parallel network coupled to a negative voltage source and coupled through a variable resistance to the grid of said blocking oscillator, and said coupling of said blocking oscillator cathode to said pentode suppressor grid is through a capacitor.

8. A self-triggered sawtooth wave generator comprising: a pentode vacuum tube with the anode and cathode coupled across a voltage supply circuit; a blocking oscillator tube having its cathode coupled to the suppressor grid of said pentode through a first capacitor; a voltage dividing network coupled to said suppressor grid to fix the level of potential thereon; an amplifier tube having a control grid connected to the screen grid of said pentode; a voltage dividing network coupled to said amplifier control grid to fix a voltage level thereon; a differentiating circuit coupling the anode of said amplifier tube and a grid of said oscillator tube; means for adjusting the bias on the grid of said oscillator tube; a cathode follower tube having a grid connected to the anode of said pentode and its cathode coupled through a second capacitor to the control grid of said pentode; a voltage divider network coupled to the pentode control grid having a variable resistor therein for varying the charging rate of said second capacitor; and a potentiometer coupled between the cathode of said cathode follower tube and low voltage supply with the adjustable tap thereof providing an output whereby a voltage wave formed on the screen grid of said pentode simultaneously with the sawtooth voltage wave formed on the anode of same is inverted, amplified, and differentiated to get a positive peak at the end of the anode conduction period of said pentode causing said blocking oscillator to produce a triggering pulse for the succeeding sawtooth voltage wave producing a succeeding sawtooth wave on the pentode anode detectable on the cathode of said cathode follower and impressed on the potentiometer output.

References Cited in the file of this patent
UNITED STATES PATENTS 2,662,178    Levell _____ Dec. 8, 1953
2,662,981    Segerstrom _____ Dec. 15, 1953

OTHER REFERENCES

"Waveforms," by Chance et al., vol. 19, Radiation Laboratory Series, pages 199, 200.

U. S. DEPARTMENT OF COMMERCE
PATENT OFFICE

CERTIFICATE OF CORRECTION

Patent No. 2,835,815　　　Van Buren Cones　　　May 20, 1958

It is hereby certified that error appears in the printed specification of the above numbered patent requiring correction and that the said Letters Patent should read as corrected below.

Column 4, lines 40 and 41, strike out "said cathode also coupled through a capacitor of said pentode,"; column 5, line 21, for "cntrol" read -- control --.

Signed and sealed this 29th day of July 1958.

(SEAL)
Attest:
KARL H. AXLINE
Attesting Officer

ROBERT C. WATSON
Commissioner of Patents